United States Patent [19]
McGrath et al.

[11] Patent Number: 5,785,393
[45] Date of Patent: Jul. 28, 1998

[54] ELECTRONIC TRAILER BRAKE CONTROLLER WITH PENDULUM ZERO ADJUST

[75] Inventors: Michael C. McGrath, Farmington Hills; Wayne M. Groleau, Novi; Michael A. Hedding, Canton; Brian J. Stockford, Ann Arbor; David Sullivan, Brighton, all of Mich.

[73] Assignee: Hayes Wheels International, Inc., Romulus, Mich.

[21] Appl. No.: 802,379

[22] Filed: Feb. 19, 1997

Related U.S. Application Data

[62] Division of Ser. No. 313,703, Sep. 27, 1994, Pat. No. 5,620,236.

[51] Int. Cl.[6] ............................................. B60T 13/00
[52] U.S. Cl. ......................... 303/7; 303/20; 303/24.1; 303/181; 73/514.36
[58] Field of Search ................................. 303/7, 20, 181, 303/199, 9.67, 24.1; 200/64.49, 64.51; 514/514.31, 514.36, 514.37

[56] References Cited

U.S. PATENT DOCUMENTS

| | | |
|---|---|---|
| 3,497,266 | 2/1970 | Umpleby . |
| 3,503,652 | 3/1970 | Broek . |
| 3,574,414 | 4/1971 | Jacob . |
| 3,738,710 | 6/1973 | Pokrinchak et al. . |
| 3,778,118 | 12/1973 | Podlewski et al. . |
| 3,780,832 | 12/1973 | Marshall . |
| 3,909,075 | 9/1975 | Pittet, Jr. et al. . |
| 3,967,863 | 7/1976 | Tomecek et al. . |
| 3,981,542 | 9/1976 | Abrams et al. . |
| 3,981,544 | 9/1976 | Tomecek et al. . |
| 4,079,804 | 3/1978 | Paillard . |
| 4,084,859 | 4/1978 | Bull et al. . |
| 4,196,936 | 4/1980 | Synder . |
| 4,295,687 | 10/1981 | Becker et al. . |
| 4,419,654 | 12/1983 | Funk . |
| 4,721,344 | 1/1988 | Frait et al. ........................... 303/20 |
| 4,849,655 | 7/1989 | Bennett ............................... 303/24.1 |
| 4,850,650 | 7/1989 | Eckert et al. . |
| 4,856,850 | 8/1989 | Aichele et al. . |
| 5,050,937 | 9/1991 | Eccleston . |
| 5,149,176 | 9/1992 | Eccleston . |
| 5,333,940 | 8/1994 | Topfer . |
| 5,333,948 | 8/1994 | Austin et al. . |

*Primary Examiner*—Lee W. Young
*Attorney, Agent, or Firm*—MacMillan, Sobanski & Todd

[57] ABSTRACT

An electronic brake controller for actuating electric wheel brakes of a towed vehicle which includes a zero adjusting circuit for a pendulum in an inertia sensor.

16 Claims, 5 Drawing Sheets

ELECTRONIC TRAILER BRAKE CONTROLLER WITH PENDULUM ZERO ADJUST

This application is a division of application Ser. No. 08/313,703, filed Sep. 27, 1994, now U.S. Pat. No. 5,620,236.

BACKGROUND OF THE INVENTION

The present invention relates in general to an electronic controller for energizing electrically operated brakes in a towed vehicle and, in particular, to an electronic brake controller which includes a remote manual control.

Towed vehicles, such as recreational and utility trailers adapted to be towed by automobiles and small trucks, are commonly provided with electric brakes. The electric brakes generally include a pair of brake shoes which, when actuated, frictionally engage a brake drum. An electromagnet is mounted on one end of a lever to actuate the brake shoes. When an electric current is applied to the electromagnet, the electromagnet is drawn against the rotating brake drum which pivots the lever to actuate the brakes. Typically, the braking force produced by the brake shoes is proportional to the electric current applied to the electromagnet. This electric current can be relatively large. For example, the electric brakes on a two wheeled trailer can draw six amperes of current when actuated and the electric brakes on a four wheeled trailer can draw 12 amperes of current.

Automotive industry standards require that electrically-actuated vehicle brakes be driven against the ground potential of the vehicle power supply. Accordingly, one end of each of the towed vehicle brake electromagnets is electrically connected to the towed vehicle ground and the towed vehicle ground is electrically connected to the towing vehicle ground. The other end of each of the brake electromagnets is electrically connected through an electric brake controller to the towing vehicle power supply.

Various electric brake controllers for towed vehicle electric brakes are known in the art. For example, a variable resistor, such as a rheostat, can be connected between the towing vehicle power supply and the brake electromagnets. The towing vehicle operator manually adjusts the variable resistor setting to vary the amount of current supplied to the brake electromagnets and thereby control the amount of braking force developed by the towed vehicle brakes.

Also known in the art are more sophisticated electric brake controllers which include electronics to automatically supply current to the brake electromagnets when the towing vehicle brakes are applied. Such electronic brake controllers typically include a sensing unit which generates a brake control signal corresponding to the desired braking effort. For example, the sensing unit can include a pendulum which is displaced from a rest position when the towing vehicle decelerates and an electronic circuit which generates a brake control signal which is proportional to the pendulum displacement. One such unit is disclosed in U.S. Pat. No. 4,721,344. Alternately, the hydraulic pressure in the towing vehicle's braking system or the pressure applied by the driver's foot to the towing vehicle's brake pedal can be sensed to generate the brake control signal.

Known electronic brake controllers also usually include an analog pulse width modulator. The input of the pulse width modulator is electrically connected to the sensing unit and receives the brake control signal therefrom. The pulse width modulator is responsive to the brake control signal for generating an output signal comprising a fixed frequency pulse train. The pulse width modulator varies the duty cycle of the pulse train in proportion to the magnitude of the brake control signal. Thus, the duty cycle of the pulse train corresponds to the amount of braking effort desired.

Electronic brake controllers further include an output stage which is electrically connected to the output of the pulse width modulator. The output stage typically has one or more power transistors which are connected between the towing vehicle power supply and the towed vehicle brake electromagnets. The power transistors function as an electronic switch for supplying electric current to the towed vehicle brakes.

The output stage is responsive to the pulse width modulator output signal to switch the power transistors between conducting, or "on", and non-conducting, or "off", states. As the output transistors are switched between their on and off states in response to the modulator output signal, the brake current is divided into a series of pulses. The power supplied to the towed vehicle brakes and the resulting level of brake application are directly proportional to the duty cycle of the modulator generated output signal.

SUMMARY OF THE INVENTION

The present invention relates to an improved electronic brake controller for actuating electric wheel brakes of a towed vehicle in response to actuation of the brakes of an associated towing vehicle which includes a remote manual control.

The electronic brake controller includes a sensor for producing a brake control signal which is representative of the desired braking of the towed vehicle. The controller also includes a control means responsive to the brake control signal for generating an output signal for actuating the electric wheel brakes of the towed vehicle. The output signal is related to the brake control signal by a controller gain, which is incrementally adjustable between a plurality of individual gain settings. The controller further includes an operator actuated means for selecting one of the plurality of gain settings and a display means for indicating to the operator the selected gain setting.

Another feature of the brake controller is a control circuit which is connected to the vehicle battery and is responsive to said brake control signal for generating the output signal. The control circuit includes means for disconnecting the vehicle battery from at least selected portions of the control circuit in the event the control circuit has remained unactuated for a predetermined time period.

The brake controller includes means responsive to the actuation of a zero adjust switch for measuring the voltage level of the brake control signal and generating a zero adjust signal in response thereto. The control means are responsive to the zero adjust voltage to adjust the brake control signal.

The brake controller can further include a means for producing a manual brake control signal which is carried by a remote housing. The means for producing a manual brake control signal is actuated by the operator to generate a manual brake control signal. The control means is responsive to at least one of the manual or the sensor brake control signals.

The brake controller also can include means for generating a triggering signal when a brake pedal of the towing vehicle is actuated. The control means is responsive to the triggering signal and the brake control signal for generating the output signal. Furthermore, the brake controller includes means for limiting the voltage level of said triggering signal supplied to said control means.

DETAILED DESCRIPTION OF THE PREFERRED EMBODIMENT

Figure 1:
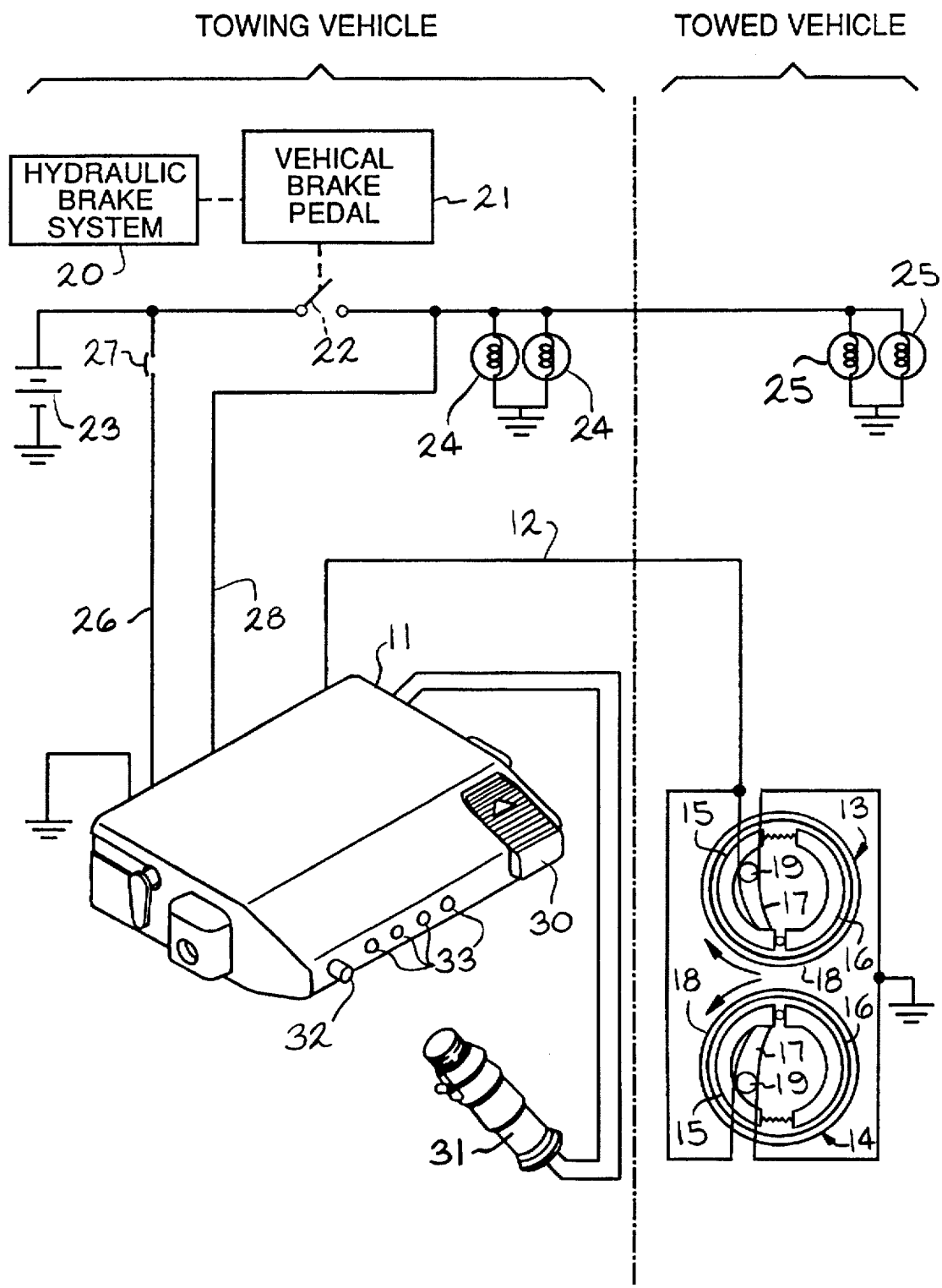
FIG. 1 is a schematic diagram illustrating an electric brake system which includes an electronic brake controller according to the present invention.

Referring now to the drawings, there is shown in FIG. 1 a schematic diagram illustrating an electric brake system for a towed vehicle (not shown), shown generally at 10, which utilizes an electronic brake controller 11 embodying the principles of the present invention. The brake controller 11 is typically located in a towing vehicle (not shown), usually being mounted beneath the towing vehicle dashboard. When actuated, the controller 11 functions to supply an electric current through line 12 to energize electric brakes 13 and 14 which brake the wheels of the towed vehicle (not shown).

The electric brakes 13 and 14 each include a pair of brake shoes 15 and 16 which, when actuated by a lever 17, are expanded into contact with a brake drum 18 for braking the wheels of the towed vehicle. A separate electromagnet 19 is mounted on an end of each of the brake actuating levers 17. Each electromagnet 19 is positioned to abut the generally flat side of the brake drum 18. As an electric current is passed through each of the electromagnets 19, the electromagnets 19 are drawn into contact with the brake drums 18 and the resulting drag pivots the levers 17 to engage the brake shoes 15 and 16 in a conventional manner. It will be appreciated that, while FIG. 1 shows two sets of brakes 13 and 14, the invention also can be applied to towed vehicles having more than two sets of brakes.

The towing vehicle typically includes a conventional hydraulic brake system 20 which is actuated when a brake pedal 21 is depressed by a vehicle driver. The brake pedal 21 is coupled to a brake light switch 22. When the brake pedal 21 is depressed, the switch 22 is closed and power from a vehicle power supply 23, shown as a storage battery in FIG. 1, is supplied to one or more towing vehicle brake lights 24 and one or more towed vehicle brake lights 25. The vehicle power supply 23 is also connected by a first line 26 through a circuit breaker 27 to the controller 11. Power is continuously supplied to the controller 11 through the first line 27. It will be appreciated that, while a circuit breaker 27 is shown in FIG. 1, a fuse or other overcurrent protection device can be used. A second line 28 connects the brake light side of the brake light switch 22 to the controller 11. Thus, power also is supplied through the second line 28 to the controller 11 when the brake light switch 22 is closed.

The brake controller 11 is normally operated in an automatic mode wherein the towed vehicle brakes 13 and 14 are automatically actuated by the controller 11 when the towing vehicle brakes are actuated. The automatic mode is activated upon closure of the brake light switch 22. When operating in the automatic mode, the controller 11 senses braking force applied to the towing vehicle and supplies an electric current through line 12 to actuate the towed vehicle brakes. The electric current is directly proportional to the braking force applied to the towing vehicle.

In some instances, it may be desirable to actuate only the towed vehicle brakes 13 and 14. This may be desirable, for example, to stabilize the towed vehicle against vacillations or swinging caused by strong side winds. Therefore, the brake controller 11 also includes a manual mode of operation. Accordingly, a manual switch 30 is provided on the electronic controller 11 to allow the vehicle driver to actuate the towed vehicle brakes 13 and 14 without applying the towing vehicle brakes. Pressing the manual switch 30 initiates the manual mode of operation. The amount of electric current supplied to the towed vehicle brakes 13 and 14 is proportional to the displacement of the manual switch 30. If the manual switch 30 is pressed while the brake pedal 21 is depressed, the manual operating mode overrides the automatic operating mode.

In accordance with one feature of the present invention, the controller 11 also is provided with a hand held manual remote switch 31. The manual remote switch 31 includes a push-button which can be used to initiate the manual mode of operation. Upon pressing the push-button, the manual remote switch 31 functions the same as the manual switch 30 to actuate the towed vehicle brakes. When either the manual switch 30 or the manual remote switch 31 are pressed, the towing vehicle and towed vehicle brake lights 24 and 25 are illuminated.

The controller 11 further includes a gain control push-button 32 mounted on a front surface thereof. The gain control push-button 32 allows the vehicle driver to vary the overall gain of the brake control system 10 to compensate for different loads carried in the towed vehicle. For example, if the load in the towed vehicle is increased, it is necessary to increase the braking force applied to the towed vehicle relative to the braking force applied to the towing vehicle. Conversely, if the load in the towed vehicle is decreased, it is necessary to decrease the braking force applied to the towed vehicle relative to the braking force applied to the towing vehicle. By adjusting the gain control, the electric current supplied by the electronic controller 11 to the brake electromagnets 19 can be increased or decreased for any given braking requirement.

In the preferred embodiment, the gain control adjustment only applies to the automatic mode of operation. The manual mode of operation is not affected by the gain setting. The gain control push-button 32 also is used to check the current gain setting of the brake control system and to awaken the controller 11 from a sleep mode, which is described below.

The controller 11 also includes an array of light emitting diodes (LED's) 33 mounted upon the front surface thereof. The LED's 33 provide a visual indication of the controller gain setting to the vehicle driver. During towed vehicle brake applications, a combination of the LED's 33 are illuminated to display the magnitude of the brake application. The LED's are also illuminated when the gain is adjusted.

Figure 2:
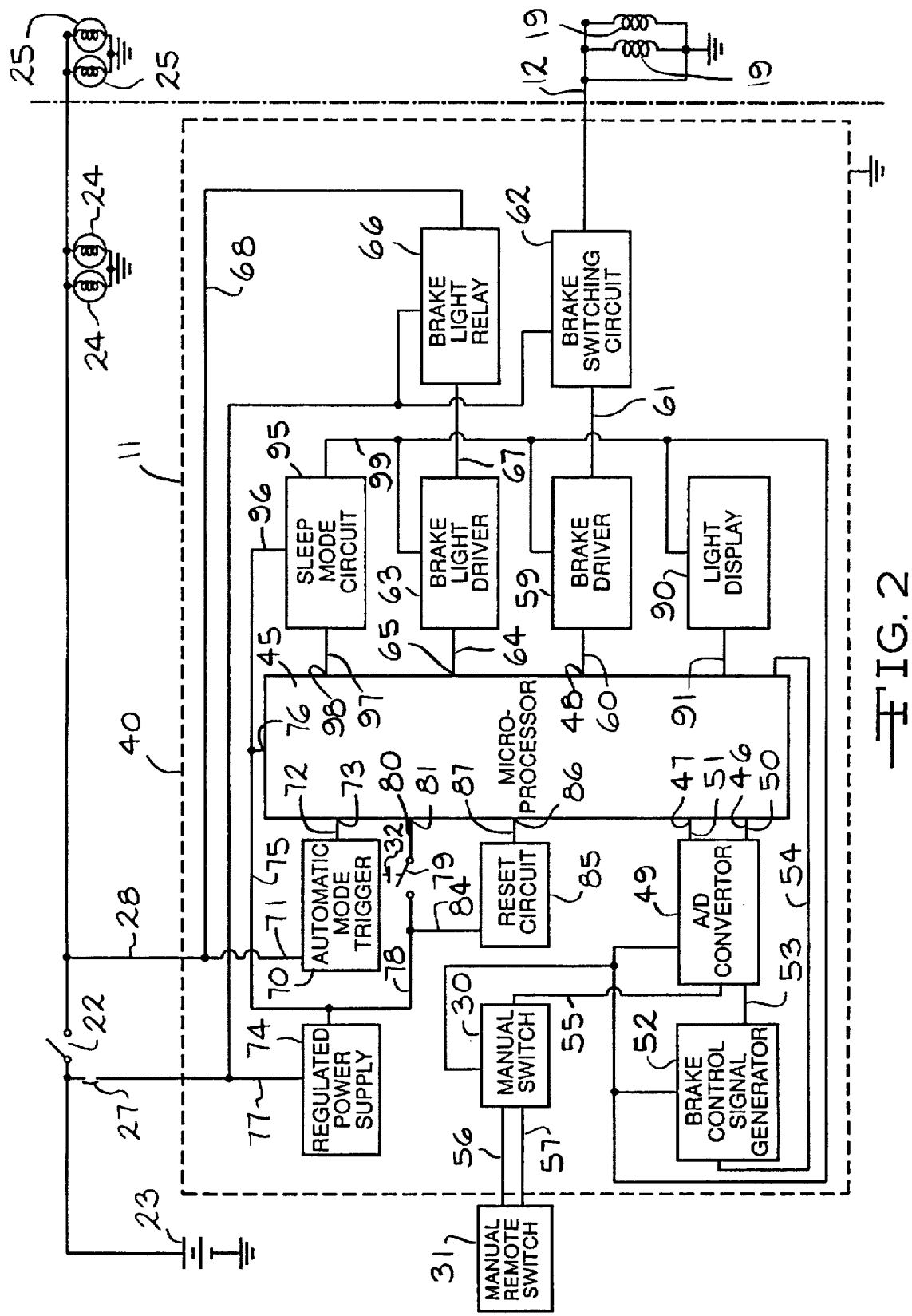
FIG. 2 is a block diagram of the electronic brake controller shown in FIG. 1.
Figure 3A:
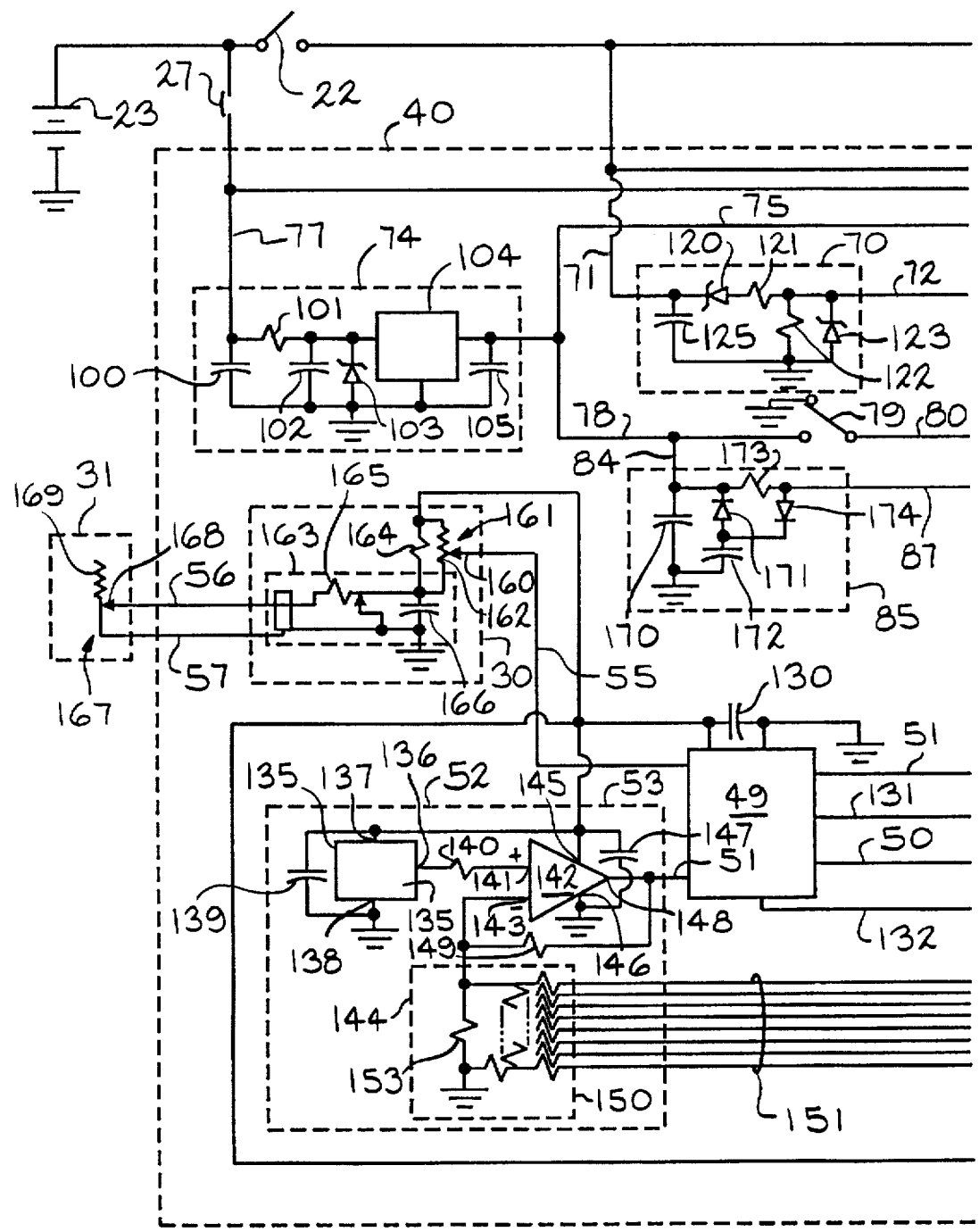
FIGS. 3A and 3B are a schematic circuit diagrams illustrating a preferred embodiment of the electronic brake controller shown in FIG. 2.
Figure 3B:
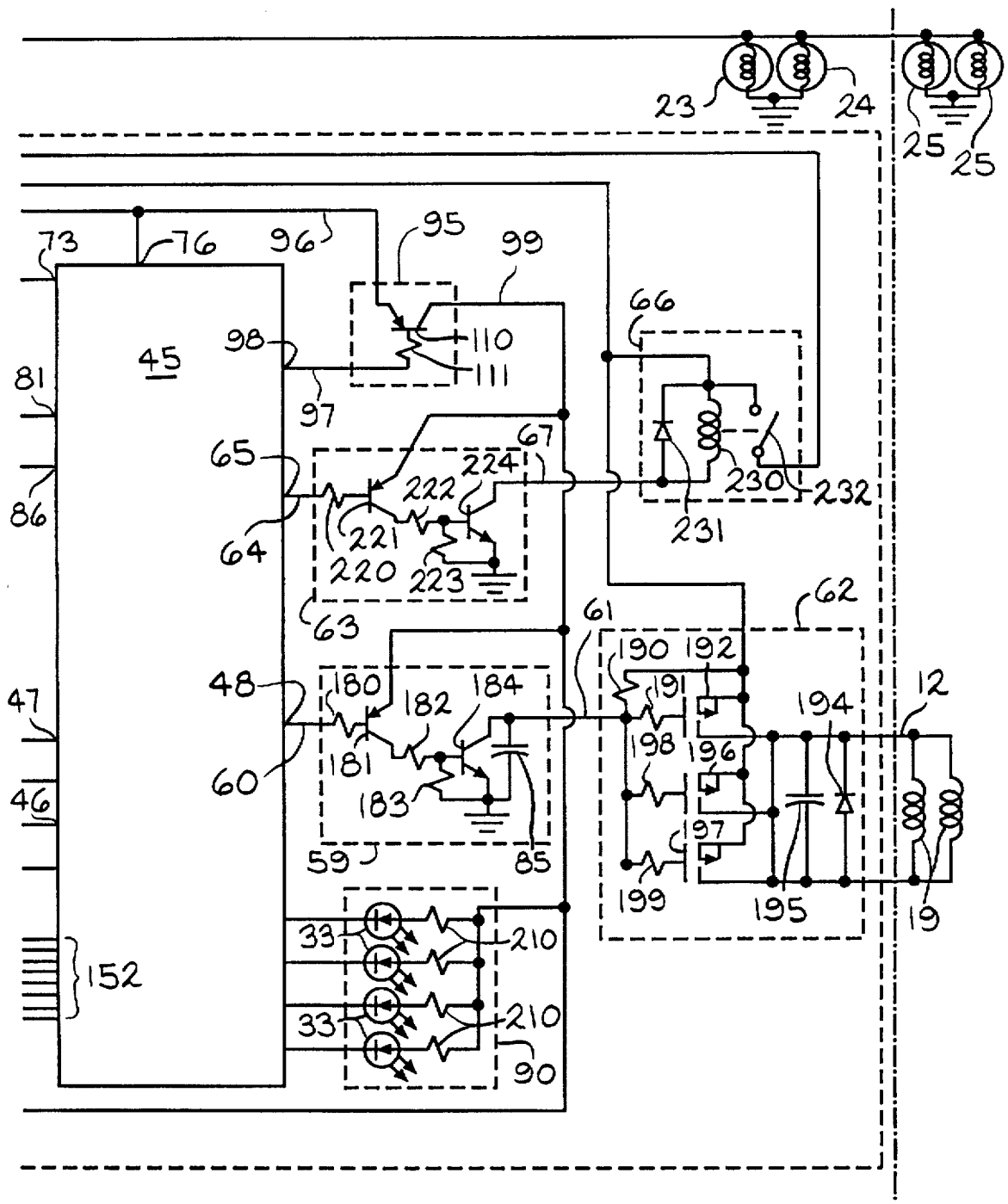

A plurality of ground connections are shown schematically in FIGS. 1 through 3 for both the towing and towed vehicles. It will be appreciated that both towing and towed vehicles usually have a common vehicle ground, typically the chassis and/or the body. Thus, the individual ground connections shown in FIG. 1 are connected to the corresponding vehicle common ground. The towing and towed vehicle common grounds are joined through the connection of the towed vehicle tongue (not shown) and the towing vehicle hitch (not shown). A supplemental electrical connector (not shown) also may connect the towing vehicle common ground to the towed vehicle common ground.

A block diagram of the electronic brake controller 11 is shown in FIG. 2 and includes several unique features. Components of the electric brake system 10 which are identical to components shown in FIG. 1 have the same numerical designators in FIG. 2. The electronic brake controller 11 is contained in a housing 40 which is outlined by a dashed line in FIGS. 2 and 3.

The controller housing 40 contains a plurality of functional blocks. Each of the functional blocks represents a subcircuit which is included in the electronic brake controller 11. As shown in FIG. 2, each functional block receives input signals from the left and transmits output signals to the right. Additionally, as shown in FIG. 2, power is supplied to the top of each functional block.

The brake controller 11 utilizes a preprogrammed eight bit microprocessor 45 which can receive two digitized brake control signals representing desired braking levels. Under normal operating conditions, the microprocessor 45 receives an automatically generated digitized brake control signal at an automatic mode input pin 46. Alternately, the microprocessor 45 can receive a manually generated digitized brake control at a manual mode input pin 47. As described above, if the microprocessor 45 simultaneously receives automatic and manual brake control signals, the microprocessor 45 responds only to the manual signal, providing an override capability. In response to the brake control signals, the microprocessor 45 generates an output signal at an output pin 48. The output signal comprises a square wave pulse train. The pulse train has a duty cycle directly proportional to the level of the brake control signal. As will be described below, the pulse train is used to control the electric current which actuates the towed vehicle brakes 13 and 14.

The controller 11 includes a two channel analog to digital (A/D) converter 49 which is electrically coupled to the input pins 46 and 47 of the microprocessor 45. The A/D converter 49 is a conventional, commercially available device which changes analog brake control signals to digital signals. The output of the first channel of the A/D converter 49 is connected by line 50 to the microprocessor automatic mode input pin 46. Similarly, the output of the second channel of the A/D converter 49 is connected by line 51 to the microprocessor manual mode input pin 47.

A brake control signal generator 52 is connected by line 53 to the input of the first channel of the A/D converter 49. The generator 52 senses a change in a towing vehicle parameter and automatically generates an analog brake control signal which is proportional to the braking force applied to the towing vehicle. As will be explained below, various devices can be used for generating the brake control signal. In the preferred embodiment, a deceleration sensor (not shown) comprising a pendulum which cooperates with a Hall effect device to generate a voltage proportional to the deceleration of the towing vehicle is used. Such a deceleration sensor is described in U.S. Pat. No. 4,726,627, which is hereby incorporated by reference. The automatic mode brake control signal generator 52 amplifies the voltage generated by the Hall effect device. The amplified voltage comprises an analog brake control signal which is supplied through line 53 to the input of the first channel of the A/D converter 49.

In the preferred embodiment, the generator 52 also includes a zero adjust circuit which provides a zero adjustment of the deceleration sensor. The zero adjust circuit is connected to the microprocessor 45 by the line 54. While one line 54 is shown in FIG. 2 for clarity, in the preferred embodiment, the line 54 comprises a plurality of individual lines. As will be explained below, the zero adjust circuit is actuated over line 54 by the microprocessor 45 following initial energization of the controller 11 or when the gain push-button 32 is held in for a predetermined time period.

The manual switch 30 is connected by line 55 to the input of the second channel of the A/D converter 48. As will be described below, pressing the manual switch 30 generates an analog manual brake control signal. The manual brake control signal also can be generated by the manual remote switch 31. The manual remote switch 31 is connected by a pair of leads 56 and 57 to the manual switch 30. In the preferred embodiment, the ends of the leads 56 and 57 are connected to a male plug (not shown). The male plug is received by a jack mounted on a side of the controller housing 40. Thus, the manual remote switch 31 can be removed from the controller 11. As will be explained below, the manual switch 30 continues to function when the manual remote switch 31 is removed.

The controller 11 further includes a brake driver 59 having an input connected by line 60 to the microprocessor output pin 48. The brake driver 59 amplifies the microprocessor output signal. The brake driver 59 has an output connected by line 61 to a brake switching circuit 62. The brake switching circuit 62 includes a plurality of P-channel MOSFET's which function as a electronic switches. The MOSFET's are connected between the towing vehicle power supply 23 and the towed vehicle brake electromagnets 19.

The brake switching circuit 62 receives an amplified output signal from the brake driver 59. The MOSFET's in the switching circuit 62 change between conducting, or "on", and non-conducting, or "off", states in accordance with the amplified output signal to control the flow of current to the brake electromagnets 19. As the duty cycle of the output signal increases, the MOSFET's are on for a greater percentage of time, allowing more power to be supplied to the brake electronmanets 19 and thereby causing a greater brake application.

The controller 11 also includes a brake light driver 63 which has an input connected by line 64 to a microprocessor brake light actuation pin 65. The brake light driver 63 has an output which is connected to a brake light relay 66 by line 67. The brake light relay 66 is connected to the towing vehicle and towed vehicle brake lights 24 and 25 by line 68. As will be explained below, the brake light driver 63 and brake light relay 66 respond to the voltage on the brake light activation pin 65 to illuminate the brake lights 24 and 25 when the manual mode of operation is actuated.

The controller 11 further includes an automatic mode trigger 70 which enables the automatic mode of the controller 11. The trigger 70 has an input which is connected by line 71 to the brake light side of the towing vehicle brake light switch 22. The automatic mode trigger 70 senses when the brake switch 22 has been closed and generates a trigger voltage. The trigger voltage is applied through line 72 to a trigger voltage input pin 73 of the microprocessor 45. A trigger voltage must be present at the input pin 73 for the microprocessor 45 to respond to an automatically generated brake control signal. When both a trigger voltage and an automatically generated brake control signal are simultaneously present at their respective microprocessor input pins 73 and 46, the microprocessor 45 will generate an output signal for actuation of the towed vehicle brakes 13 and 14.

Upon release of the brake pedal 21, the brake light switch 22 opens. This deactivates the automatic mode trigger 70 and removes the trigger voltage from the trigger voltage input pin 73. Accordingly, the microprocessor 45 ceases generation of the output signal, allowing release of the towed vehicle brakes 13 and 14. The output signal generation will cease even if the brake control signal remains at input pin 73.

The automatic mode trigger 70 causes the microprocessor 45 to filter out erroneous brake control signals. Such signals can be generated by the automatic mode brake control signal generator 53 in response to motion of the towing vehicle while traversing a rough road. If the brake pedal has not been depressed to cause the automatic mode trigger 70 to generate a trigger voltage, the microprocessor 45 will not respond to these brake control signals. Thus, the towed vehicle brakes 13 and 14 are not erroneously actuated due to motion of the towing vehicle.

A regulated power supply 74 has an output connected by line 75 to a power supply pin 76 of the microprocessor 45. The input side of the regulated power supply 74 is connected by a supply line 77 through the circuit breaker 27 to the towing vehicle power supply 23. The regulated power supply provides power at a regulated voltage level to the microprocessor 45 and other selected circuits in the a controller 11. In the preferred embodiment, the regulated voltage level is five volts.

The output of the regulated power supply 74 also is connected by a line 78 to the normally open terminal of a single pole double throw (SPDT) switch 79. The center pole of the switch 79 is connected by a line 80 to a gain input pin 81 of the microprocessor 45. The switch 79 is mechanically coupled to the gain control push-button 32. When the gain control push-button 32 is pressed, the switch 79 is closed, applying the regulated voltage to the microprocessor input pin 81. Thus, the switch 79 provides an interface between the vehicle driver and the microprocessor. As will be described below, the vehicle driver can incrementally change the system gain by pressing the gain control push-button 32.

The output of the regulated power supply 76 is connected by line 84 to a reset circuit 85. The reset circuit 85 has an output which is connected to a reset pin 86 of the microprocessor 45 by a line 87. The reset circuit 85 functions to reset the microprocessor 45 when power is initially applied to the controller 11. The reset circuit 85 also resets the microprocessor 45 following restoration of power as, for example, can occur following maintenance of the towing vehicle or the controller 11.

The microprocessor 45 actuates a light display 90 through a line 91. While one line 91 is shown in FIG. 2 for clarity, the line 91 comprises a plurality of individual lines in the preferred embodiment. The light display 90 includes the array of LED's 33 mounted in the front panel of the controller 11. As described above, the microprocessor 45 is operable to illuminate selected LED's 33 to provide a visual indication of braking level or gain setting to the vehicle driver.

The controller 11 has a sleep mode, or standby, circuit 95. As will be explained below, the sleep mode circuit 95 is an electronic switch which controls the supply of regulated power to selected portions of the controller 11. The sleep mode circuit 95 receives power from the regulated power supply 76 through a line 96. The sleep mode circuit 95 has an input which is connected by line 97 to a sleep mode output pin 98 of the microprocessor 45 and an output connected to line 99. The sleep mode circuit 95 is actuated after a predetermined time has elapsed following the last brake application. Upon actuation, the sleep mode circuit 95 deenergizes selected portions of the controller 11 by shutting off the supply of regulated power through output line 99. In the preferred embodiment, the selected portions include the brake light driver 63, brake driver 59, light display 90, A/D converter 49, brake control signal generator 52 and manual remote switches 30 and 31. The sleep mode circuit 95 conserves the towing-vehicle power supply 23 during periods of towing vehicle inactivity. Upon operation of the towing vehicle brakes or the gain control push-button 32, the microprocessor 45 causes the sleep mode circuit 95 to restore power to the deenergized portions of the controller 11.

A schematic circuit diagram of the brake controller 11 shown in FIG. 2 is illustrated in FIG. 3. Components of the electric brake system 10 which are identical to components shown in FIGS. 1 and 2 have the same numerical designators in FIG. 3.

As indicated above, the brake controller 11 includes a microprocessor 45. The microprocessor 45 is an eight bit integrated circuit which includes a memory. The microprocessor is programmed to control operation of the electric brake system 10. In the preferred embodiment, a commercially available microprocessor from Texas Instruments in Houston, Tex., is used. For clarity in FIG. 3, a conventional crystal circuit, which is externally connected to the microprocessor 45 to sot the internal operating frequency, is not shown. Similarly, any unused microprocessor connector pins are not shown. Following conventional practice, such unused pins are connected to circuit ground through a resistor. Additionally, the arrangement of microprocessor pins shown in FIG. 3 does not necessarily correspond to the actual physical arrangement of the pins on the microprocessor package.

In the preferred embodiment, the microprocessor 45 is programmed during fabrication by loading specific software into the microprocessor memory. The software includes the operating instructions which control the response of the microprocessor 45 to various input signals. The software also includes a table of preset gain values for-the brake system 10. The preset gain values range from a minimum to a maximum and include a default value. The default value is selected by the microprocessor 45 following initial energization or reenergization. As will be explained below, the response of the brake system 10 can be tailored by the vehicle driver selecting a particular gain value to match a particular load. Alternately, a read only memory (ROM) which is preprogrammed with the operating instructions and table of gain values can be included in the microprocessor 45.

During operation of the controller 11, the microprocessor 45 continuously monitors the voltage levels at a plurality of input pins. In the preferred embodiment, the input pins are either at circuit ground potential, which is referred to in the following description as "low", or at five volts, which is referred to in the following description as "high". In response to these input voltage levels and the software instructions in the memory, the microprocessor 45 causes the voltage level at output pins to be either high or low. As will be explained below, the voltages at the output pins control a number of functions, such as actuation of the towed vehicle brakes 13 and 14 and illumination of the brake lights 24 and 25 and the light display 90.

As described above, the microprocessor 45 receives power at the power supply pin 76 from the regulated power supply 74. As shown in FIGS. 2 and 3, the regulated power supply 74 is connected through the circuit breaker 27 to the towing vehicle power supply 23 by the supply line 77 to provide a continuous supply of power to the microprocessor 45.

The regulated power supply 74 includes an input filter capacitor 100 which is connected between the supply line 77 and the circuit ground to remove unwanted electrical noise from the towing vehicle supply voltage, $V_b$. It will be appreciated that, while separate circuit grounds are described in the following discussion and shown in FIG. 3, all the individual circuit grounds are actually a portion of a common brake controller ground. The common brake controller ground is connected through the towing vehicle common ground to the grounded terminal of the towing vehicle power supply 23. The junction of the input capacitor 100 and the supply line 77 is connected through a voltage dropping resistor 101 to one end of an intermediate filter capacitor 102. The other end of the intermediate filter capacitor 102 is connected to the circuit ground. A zener diode 103 is connected across the intermediate capacitor 103 with an anode connected to the circuit ground and a cathode connected to an input pin of an integrated voltage regulator circuit 104. The zener diode 103 clamps the regulator circuit input voltage to a maximum of 26 volts to protect the controller 11 from voltage spikes. The voltage Regulator circuit 104 is a conventional device and has a ground pin connected to the circuit ground. In the preferred embodiment, a LM 2931 voltage regulator circuit, which is available from National Semiconductor in Santa Clara, Calif., is used to supply a regulated voltage, $V_r$, of five volts to the microprocessor 45 and portions of the controller circuit. An output filter capacitor 105 is connected between an output pin of the voltage regulator circuit 104 and the circuit ground. It will be noted that, in addition to the regulated power supply 74, the vehicle power supply 23 is utilized to power portions of the controller circuit.

As described above, the brake controller 11 has a sleep mode circuit 95. The sleep mode circuit 95 includes a bipolar transistor 110 having an emitter connected through line 96 to the output of the regulated power supply 74. The base of the transistor 110 is connected through a resistor 111 to the sleep mode output pin 98 of the microprocessor 45. The collector of the transistor 110 is connected through output line 99 to supply the sleep mode circuit output voltage, $V_s$, to selected circuits in the controller 11, as described above.

When the brake controller 11 is actuated by the vehicle driver depressing the brake pedal 21 or pressing the gain control push-button 32, the microprocessor is programmed to set the output pin 98 low. This pulls down the base of the transistor 110 to ground, causing the transistor 110 to conduct. When the transistor 110 conducts, $V_s$ is effectively the same as $V_r$ and the controller circuits connected to the transistor collector are energized. If no brake activity occurs for a predetermined period of time, which, in the preferred embodiment is eight hours, the microprocessor 45 causes the output pin 98 to go high, applying the regulated voltage $V_r$ to the base of the transistor 110. This causes the transistor 110 to stop conducting, thereby shutting off the supply of power to the selected controller circuits to conserve the energy contained in the towing vehicle storage battery 23.

As described above, the automatic mode trigger 70 generates a trigger voltage to enable the automatic mode of operation for the microprocessor 45. The trigger circuit 70 includes a first zener diode 120 having a nominal breakdown voltage of 6.2 volts. The cathode of the first zener diode 120 is connected to the battery voltage supply line 71 and the anode is connected to a voltage divider consisting of a first resistor 121 connected in series to a second resistor 122. The second resistor 122 is connected to circuit ground. A second zener diode 123 having a nominal five volt breakdown voltage is connected across the second resistor 122 with the anode connected to the grounded end of the resistor 122. The junction of the resistors 121 and 122 is connected by line 72 to the trigger signal input pin 73 of the microprocessor 45. A noise filtering capacitor 125 is connected between the cathode of the first zener diode 120 and the circuit ground to remove any undesired electrical noise which may be superimposed upon $V_b$.

When the brake light switch 22 is open, there will be no current flow to the trigger 70 and the microprocessor trigger voltage input pin 73 will be at ground potential. The microprocessor 45 continuously monitors the voltage at the trigger input pin 73. The microprocessor 45 is programmed to not respond to any automatic mode brake control signal which appears on microprocessor pin 46 while the input pin 73 is at ground potential.

When the brake light switch 22 is closed to actuate the brake lights 24 and 25, the towing vehicle battery voltage $V_b$ appears at the cathode of the first zener diode 120 in the trigger circuit 70. Any voltage over 6.2 volts will cause the first zener diode 120 to conduct. When the first zener diode 120 conducts, the voltage between its anode and cathode is clamped to a maximum of 6.2 volts.

Any voltage applied to the trigger 70 in excess of 6.2 volts is divided across the resistors 121 and 122. The voltage across the second resistor 122 also is across the second zener diode 123 and is applied to the trigger voltage input pin 73. In the preferred embodiment, a voltage in excess of 0.8 volts is needed at the microprocessor input pin 73 to enable the automatic mode of operation for the brake controller 11. The second zener diode 123 clamps the voltage across the second resistor 122 at a maximum of five volts to protect the microprocessor 45 from an overvoltage condition.

In the preferred embodiment, a minimum of approximately eight volts is needed at the input of the trigger 70 to cause 0.8 volts to appear at the microprocessor trigger input pin 73. Thus, the trigger 70 prevents low voltages, such as can be caused by leakage current through a partially short circuited brake light switch 22 or brake light 24 and 25, from causing generation of false trigger signals. If greater voltages are applied to the trigger 70, the maximum voltage appearing on the microprocessor trigger input pin is limited to five volts. In the preferred embodiment, this occurs when approximately 14 volts is applied to the input of the trigger 70. Thus, the trigger 70 protects the microprocessor 45 from potentially damaging voltage spikes which may be present in towing vehicle's electrical circuit.

As described above, depressing the gain adjust push-button 32 closes a normally open SPDT switch 79. The center pole of the switch 79 is connected the gain input pin 81 of the microprocessor 45. The normally closed switch terminal is connected to circuit ground and the normally open terminal is connected to the output of the regulated voltage supply 74. Thus, the gain input pin 81 is normally connected to circuit ground, but when the vehicle driver presses the push-button 32, the switch 79 is closed and $V_r$ is applied to the gain input pin 81. Upon release of the push-button 32, the switch 79 reopens and the gain input terminal 81 is again connected to circuit ground.

The microprocessor 45 is selectively responsive to manipulation of the gain push-button 32. If the push-button 32 is momentarily pressed and released, the microprocessor 45 will illuminate selected LED's in the light display 90 to indicate the current gain setting for the brake system 10. Also, pressing and releasing the push-button will awaken the controller 11 from the sleep mode, if appropriate. If the push-button 32 is repeatedly pressed and released, the microprocessor 45 will change the gain setting, as will be described below. If the push-button 32 is continuously pressed for a predetermined period of time, which is five seconds in the preferred embodiment, the microprocessor 45 will provide a zero adjustment to the deceleration sensor in the brake control signal generator 52, as will also be described below.

As indicated above, the microprocessor receives digital automatic and manual brake control signals from the analog to digital (A/D) converter 49. The A/D converter 49 is a commercially available device. In the preferred embodiment, an ADC 08032 CIN A/D converter, available from National Semiconductor in Santa Clara, Calif., is used. The A/D converter 49 includes first and second channels for converting two analog brake control signals to digital signals. The brake control signal generator 52 is connected to the input terminal of the first A/D converter channel while the manual switch 30 is connected to the input terminal of the second A/D converter channel. The corresponding digital brake control signals appear at first and second converter output terminals which are directly connected by the input lines 50 and 51 to the automatic and manual mode input pins 46 and 47, respectively, on the microprocessor 45. The A/D converter 49 is supplied with power from the sleep mode circuit 95. An input capacitor 130 connected between the power supply line 99 and the circuit ground filters out undesired electrical noise from the power supply signal. The A/D converter 49 also receives a clock signal over line 131 and an enable signal over line 132 from the microprocessor 45. The enable signal causes the A/D converter 49 to begin processing data.

The A/D converter 49 samples each analog brake control signal at a rate determined by the clock signal supplied by the microprocessor 45 on line 131. The converter 49 generates a digital brake control signal comprising a binary coded pulse train representing the sampled values. In the preferred embodiment, the pulses vary between the circuit ground potential and five volts. Thus, as the digital brake control signals are applied to the microprocessor 45, the input pins 46 and 47 are switched between high and low states.

The brake control signal generator 52 includes a means for sensing a change in the towing vehicle parameters. As indicated above, the preferred embodiment has a pendulum device 135 that senses deceleration of the towing vehicle. The device 135 includes a permanent magnet (not shown) which is mounted on a pendulum and is free to move therewith relative to a fixed Hall effect device (not shown). The pendulum device 135 receives power at a power supply terminal 137 from the sleep mode control circuit 95 and has a ground terminal 138 connected to system ground. An input capacitor 139 is connected between the power supply terminal and circuit ground to filter out undesired electrical noise.

When the towing vehicle brakes are applied, the deceleration force exerted upon the vehicle causes the pendulum and magnet to move relative to the Hall effect device. The movement of magnet changes the magnetic field applied to the Hall effect device, thereby causing a change in the voltage appearing at an output terminal 136. The greater the brake application, the more the pendulum moves and the greater the change in output voltage. Thus, the output voltage from the pendulum device 135 is proportional to the magnitude of the brake application.

While a pendulum device 135 has been described as the means for sensing a change in the towing vehicle parameters, it will be appreciated that other means can be used to generate the automatic brake control signal. For example, the hydraulic brake fluid pressure can be sensed and used to generate the control signal. A means for sensing the brake fluid pressure is described in U.S. Pat. No. 4,295,687, which is hereby incorporated by reference. Similarly, the force applied to the brake pedal 21 can be sensed by a pressure sensitive pad (not shown) attached thereto. The pad, which generates a brake control signal proportional to the applied force, is described in U.S. Pat. No. 5,115,162, which is hereby incorporated by reference. The automatic brake control signal also can be generated by microprocessors used to control anti-lock and traction control systems. Additionally, electromagnetic sensors using magnetically actuated potentiometers can be used to generate an analog brake control signal.

The brake control signal generated by the pendulum device 135 is applied through a resistor 140 to the positive, or non-inverting, input terminal 141 of an operational amplifier 142. The operational amplifier 142 also has a negative, or inverting, input terminal 143 which is connected to the output of a zero adjust circuit 144. The zero adjust circuit 144, as will be described below, provides a null voltage to zero the rest position of the pendulum. The operational amplifier 142 has a power supply terminal 145 that is connected to the sleep mode circuit 95 and a ground terminal 146 connected to circuit ground. Electrical noise is filtered by an input capacitor 147 connected between the power supply terminal 145 and circuit ground. An amplified analog brake control signal appears at an output terminal 148 of the operational amplifier 142 and is supplied through line 53 to the input of the first channel of the A/D converter 49. A feedback resistor 149 is connected between the operational amplifier output terminal 148 and the negative input terminal 143.

The zero adjust circuit 144 includes a resistor array 150 having multiple inputs connected by a plurality of lines 151 to corresponding zero set output pins 152 on the microprocessor 45. It is noted that, for clarity, the multiple lines 151 are illustrated by a single line 54 in FIG. 2. The output of the resistor array 150 is connected across a load resistor 153. One end of the load resistor 153 is connected to circuit ground while the other end is connected to the negative input terminal 143 of the operational amplifier 142.

Typically, when the controller 11 is installed, the pendulum device 135 may generate a small bias voltage when the pendulum is in the rest position. This bias voltage is electronically reduced to zero by the microprocessor 45 and the zero adjust circuit 144. The zeroing process is manually initiated by the microprocessor 45 when the vehicle driver holds the gain control push-button 32 in a depressed position for more than five seconds. Once the process is initiated, the push-button 32 can be released. Alternately, the zeroing process is automatically initiated when the microprocessor 45 is energized.

During the zeroing process, the microprocessor 45 senses the bias voltage being supplied to input pin 46 by the brake control signal generator 52 through the A/D converter 49. The microprocessor 45 compares the magnitude of the bias voltage to a set of predetermined values stored in a data table. The microprocessor 45 selects the stored value which is closest to the sensed bias voltage. The stored data table also includes a plurality of combinations of input points for the resistor array 150. There is one combination of input points for each of the stored values. Accordingly, the microprocessor selects the combination of input points which corresponds to the selected value. The microprocessor 45 applies the regulated voltage $V_r$ to the zero set output pins 152 which are connected to the selected input points of the resistor array 150. This causes the zero adjust circuit 144 to generate a null voltage. The resulting null voltage is applied to the negative input terminal 143 of the operational amplifier 142. The comparator portion of the operational amplifier 142 subtracts the null voltage from the bias voltage generated by the pendulum device 135 to effectively reduce the bias voltage to zero. The microprocessor 45 then flashes the LED's in the light display 90 to signal the vehicle driver that the zeroing process is complete. While the above zeroing process has been described in terms of the resistor array 150, it will be appreciated that the null voltage correction can be generated and applied to the brake control signal internally to the microprocessor 45.

An analog manual brake control signal generated by moving the manual switch 30 is applied directly to the input of the second channel of the A/D converter 49. The manual switch 30 is mechanically connected to a slider 160 of a potentiometer 161. The potentiometer 161 includes a resistor 162 having one end connected to the output of the sleep mode circuit 96 and the other end connected through a manual remote switch jack 163 to the circuit ground. The potentiometer 161 includes a spring (not shown) which urges the slider 160 towards the grounded end of the potentiometer resistor 162. A current limiting shunt resistor 164 is connected across the potentiometer resistor 162.

With the manual switch 32 in its normal position, the potentiometer slider 160 is at the grounded end of the potentiometer resistor 162 and no voltage appears between the potentiometer slider 160 and ground. However, as the manual switch 32 is pressed by the vehicle operator, the slider 160 is moved towards the end of the resistor 162 connected to the sleep mode circuit 95 and a voltage appears between the potentiometer slider 160 and ground. As the slider 160 is moved further, the voltage increases. This voltage is the manual brake control signal and is applied directly to the input of the second channel of the A/D converter 48. Because the manual signal can vary from a minimum of zero to a maximum of five volts, amplification is not needed. Upon releasing the manual switch 32, the spring urges the slider 160 towards the grounded terminal of the potentiometer resistor 162 and the manual brake control signal returns to zero.

The jack 163 provides a means for connecting the manual remote switch 31 to the controller 11. The jack 163 includes a normally closed switch 165 that connects the grounded end of the potentiometer resistor 162 in the manual switch 30 directly to the circuit ground when the manual remote switch 31 is disconnected from the controller 11. Thus the controller 11 is fully operable with the manual remote switch 31 removed. The manual remote switch 31 and a noise filter capacitor 166 are connected across the switch 165.

The manual remote switch 31 includes a second potentiometer 167 having a slider 168, which is operatively connected to a push-button (not shown) mounted in the manual remote switch 31, and a potentiometer resistor 169. The potentiometer slider 168 is connected to one end of the first switch lead 56, while the potentiometer resistor 169 is connected to one end of the second switch lead 57. The other ends of the remote manual switch leads 56 and 57 terminate in a male plug (not shown). Inserting the male plug into the jack 163 opens the switch 165 and connects the first switch lead 56 to the current limiting resistor 164 and the second switch lead 57 to the circuit ground. Thus, the manual remote switch 31 is connected through the manual switch 30 to the input of the second channel of the A/D converter 48. The manual remote switch 31 also includes a spring (not shown) which urges the slider 168 towards the grounded end of the potentiometer resistor 169. The second potentiometer 167 operates in the same manner as the manual switch potentiometer 161 to generate a manual brake control signal.

The reset circuit 85 receives power directly from the regulated power supply 74 over a line 84 and stores sufficient energy to generate a reset pulse for the microprocessor 45. The reset circuit 85 includes an input filter capacitor 170 which is connected between the regulated power supply line 78 and circuit ground. A first diode 171 has a cathode connected to the regulated voltage supply side of the input capacitor 170. A timing capacitor 172 is connected between the anode of the first diode 171 and the circuit ground. One end of a timing resistor 173 is connected to the cathode of the first diode 171. The other end of the timing resistor 173 is connected to the cathode of a second diode 174. The anode of the second diode 174 is connected to the junction of the cathode of the first diode 171 and the timing capacitor 172. The cathode of the second diode 174 is connected by the line 87 to the reset pin 86 of the microprocessor 45.

Upon initial application or reapplication of power to the electronic controller 11, the reset circuit 85 generates a reset pulse which causes the microprocessor 45 to zero all internal counters and set all internal variables to a predetermined initial value. This occurs upon initial installation of the controller 11 and following any power interruption. When the regulated voltage $V_r$ is applied to the reset circuit 85, the timing capacitor 172 charges through the timing resistor 173 and the second diode 174. Once the voltage across the timing capacitor 172 reaches $V_r$, the timing capacitor 172 discharges through the first diode 171 and the timing resistor 173 into the microprocessor reset pin 86. The values of the timing capacitor 172 and timing resistor 173 are selected to match the specific reset requirements of the microprocessor 45 to assure that initialization occurs.

As described above, the microprocessor 45 generates an output signal comprising a constant frequency pulse train having a duty cycle that is proportional to the magnitude of the brake control signal. The pulse train appears at the output pin 48 which is connected by the line 60 to the input of the brake driver 59.

The brake driver 59 is a push-pull amplifier circuit. The brake driver 59 includes an input resistor 180 connected between the line 59 and the base of a first stage bipolar transistor 181. The emitter of the first stage transistor 181 is connected to the output of the sleep mode circuit 96 and the collector is connected to a first resistor 182 of a voltage divider. The voltage divider includes a second resistor 183 connected between the first resistor 182 and circuit ground. The junction of the two resistors 182 and 183 is connected to the base of a second stage bipolar transistor 184. The emitter of the second stage transistor 184 is emitter connected the circuit ground and the collector is connected through line 61 to the brake switching circuit 62. A filter capacitor 185 is connected between the collector of the second stage transistor 185 and circuit ground to remove electrical noise from the output signal.

When the microprocessor output pin 48 is low, the pin 48 is at circuit ground potential and both stage transistors 181 and 184 in the brake driver 59 are in their non-conducting, or off, states. As will be explained below, when the second stage transistor 184 is off, $V_b$, or 12 volts, appears on the line 61 connecting the brake driver circuit 59 to the brake switching circuit 62. When the microprocessor output pin 48 goes high to five volts, both transistors 181 and 184 are switched to their conducting, or on, states and the collector of the second stage transistor 184 is pulled to ground potential. Thus, the collector voltage of the second stage transistor 184 varies between zero and 12 volts inversely with the microprocessor output signal. Accordingly, the bipolar driver transistors 181 and 184 function to invert and amplify the microprocessor output signal. The collector voltage of the second stage transistor 184 is applied to the brake switching circuit 62. The microprocessor 45 used in the preferred embodiment does not have sufficient output signal power to directly drive the brake switching circuit 62.

The brake switching circuit 62 has a current limiting resistor 190 connected between the towing vehicle power supply 23 and the collector of the brake driver second stage transistor 184. The junction of the current limiting resistor 190 and the transistor emitter is connected through an input resistor 191 to the gate of a P-channel power MOSFET 192. The source of the MOSFET 192 is connected to the towing vehicle power supply 23 and the drain is connected through the brake electromagnets 19 to the towed vehicle ground. An output diode 194 is connected between the MOSFET drain and circuit ground. The output diode 194 provides a current path to continue the flow of inductive current through the brake electromagnets 19 when the MOSFET 192 is turned off. This provides an alternate path for the braking current to avoid damaging the MOSFET 192 and other components in the controller 11 from inductive voltage spikes. A noise filter capacitor 195 is connected across the output diode 194.

As shown in FIG. 3, two additional P-channel power MOSFET's 196 and 197 have gates connected through resistors 198 and 199, respectively to the junction of the current limiting resistor 190 and the emitter of the brake driver second stage transistor 184. The sources of the additional MOSFET's 196 and 197 are connected to the towing vehicle power supply, $V_b$, and the drains are connected to the brake electromagnets 19.

For the preferred embodiment shown in FIG. 3, the parallel connection of the three MOSFET's 192, 196 and 197 allows the controller 11 to control a current sufficient to energize eight brake electromagnets on a multi-axle towed vehicle. However, it will be appreciated that while three MOSFET's are illustrated in FIG. 3, the invention can be practiced with a larger or smaller number of MOSFET's.

MOSFET's have a lower internal resistance than bipolar PNP power transistors and thus operate more efficiently, requiring less dissipation-of heat. Additionally, a simpler driver circuit than required for a N-channel MOSFET is used to drive the P-channel MOSFET's 192, 196 and 197 in the present invention.

The brake driver 59 switches the MOSFET's on and off in correspondence with the duty cycle of the output signal generated by the microprocessor 45. As indicated above, when the microprocessor output pin 48 is low the brake driver second stage transistor 184 is off and effectively no current flows through the input resistor 190 of the brake switching circuit 62. Accordingly, the junction of the collector of the brake driver second stage transistor 184 and the current limiting resistor 190 is at $V_b$. This voltage also appears at the gate of each of the MOSFET's 192, 196 and 197, causing them to be in their non-conducting, or off, state.

When the microprocessor output pin 48 goes high, both first and second stage brake driver transistors 181 and 184 are switched to their conductive states. Accordingly, current flows through the brake switching circuit current limiting resistor 190 and the brake driver second stage transistor 184, pulling the gates of each of the MOSFET's 192, 196 and 197 down to effectively zero potential. This switches the MOSFET's to their conductive states, allowing current to flow from the towing vehicle power supply 23 to the towed vehicle brake electromagnets 19. Thus, the current supplied to the electromagnets 19 is switched on whenever the microprocessor output pin 58 is high and off when the output pin 58 is low. As the duty cycle of the output signal increases, the MOSFET's 192, 196 and 197 remain conductive for a longer portion of each cycle. Accordingly, the power delivered to the electromagnets 19 and the resulting braking action is directly proportional to the duty cycle of the microprocessor output signal.

The microprocessor 45 drives the light display 90. In the preferred embodiment of the invention, the light display includes four light emitting diodes (LED's) 33. Each LED 33 has one terminal connected through a current limiting resistor 210 to the output of the sleep mode circuit 95. The other terminal of each LED 33 is connected to a corresponding microprocessor output pin. When a particular microprocessor output pin is high, no current flows through the corresponding LED 33 and the LED 33 is not illuminated. When the microprocessor output pin is low, current flows through the corresponding LED 33 and the LED 33 is illuminated. While the invention has been described above as having four LED's 33, it will be appreciated that the invention can be practiced using more or less LED's.

The microprocessor 45 is programmed to illuminate particular combinations of the LED's 33 to provide visual information concerning the brake system 10 to the vehicle driver. Upon actuation of the towed vehicle brakes 13 and 14 in either the automatic or manual mode of operation, one to four LED's are illuminated to indicate the duty cycle of the microprocessor output signal, which is representative of the degree of brake application. In the automatic braking mode, one LED remains illuminated after the vehicles stop and until the brake pedal 21 is released. When the system gain is adjusted, the LED's 33 are sequentially illuminated to indicate the gain setting. In the preferred embodiment, combinations of the four LED's 33 are illuminated to display eight gain levels. As indicated above, the LED's 33 will flash to signal completion of the process of zeroing the deceleration sensor 135.

In the manual mode of operation, the microprocessor 45 actuates the brake light driver 63 when the towed vehicle brakes 13 and 14 are actuated. The brake light driver 63 is a push-pull amplifier circuit similar to the brake driver 60. The brake light driver 63 includes an input resistor 220 having one end connected to the base of a first stage transistor 221. The other end of the input resistor 220 is connected by the line 64 to the brake light actuation pin 65 of the microprocessor 45. The emitter of the first stage transistor 221 is connected to the output of the sleep mode control circuit 95 and the collector is connected to a first resistor 222 of a voltage divider. The voltage divider includes a second resistor 223 connected between the first resistor 222 and circuit ground. The junction of the two resistors 222 and 223 is connected to the base of a second stage transistor 224. The emitter of the second stage transistor 224 is connected to the circuit ground and the collector is connected through the line 67 to the brake light relay 66.

The brake light relay 66 includes a relay coil 230 connected between the towing vehicle power supply 23 and the line 67 coming from the brake light driver 63. A diode 231 is connected across the relay coil 230 to provide a flow path for inductive current when the brake light driver 63 switches to its off state. The relay 66 also includes a set of normally open contacts 232 which are connected between the towing vehicle power supply 23 and the brake lights 24 and 25.

During operation of the electric brake system 10 in the automatic mode, the microprocessor brake light actuation pin 65 is at ground potential. This causes both the first and second stage transistors 221 and 224 in the brake light driver 63 to be in their non-conducting, or off, states. Accordingly, no current flows through the relay coil 230 and the relay contacts 232 are open. However, during automatic operation, the towed vehicle brakes 13 and 14 are only actuated when the stop light switch 22 is closed. Closure of the stop light switch 22 illuminates the brake lights 24 and 25.

When the microprocessor 45 actuates the towed vehicle brakes 13 and 14 in response to a manual brake control signal, the brake light actuation pin 63 goes high. This causes both first and second stage transistors 221 and 224 in the brake light driver 63 to switch to their conducting states. When the second stage transistor 224 conducts, current flows through the relay coil 230 in the brake-light relay 66, closing the coil contacts 232 to illuminate the brake lights 24 and 25. Upon de-actuation of the towed vehicle brakes 13 and 14, the brake light actuation pin 65 returns to low, or ground potential, causing both stage transistors 221 and 224 to revert to their non-conducting states. This interrupts the current flow through the relay coil 230 and causes the relay contacts 232 to reopen.

The operation of the electric brake system 10 will now be summarized. Upon initial application of power to the controller 11, the reset circuit 85 generates a reset pulse at the microprocessor reset pin 86 causing the microprocessor 45 to set all the parameters included therein to their initial values. The microprocessor 45 switches the sleep mode control transistor 11 to its on-state to provide regulated power to the selected circuits in the controller 11.

Also upon initial application of power, the microprocessor 45 sets the system gain to a predetermined default value, which, in the preferred embodiment, is the minimum gain setting. However, the vehicle operator can incrementally adjust the system gain for the automatic mode of operation to match the towed load by repeatedly depressing and releasing the gain control push-button 32. In response to the operation of the gain control push-button 32, the microprocessor 45 will index the gain through a set of increasing gain values while illuminating a combination of LED's 33 which corresponds to each gain setting. In the preferred embodiment, there are eight discrete preprogrammed gains ranging from minimum gain to maximum gain. Once the maximum gain is reached, continued pressing of the gain control push-button 32 causes the microprocessor 45 to return the gain to minimum and repeat the sequence. The gain can be reset using this procedure at any time. Thus, the vehicle driver can easily recalibrate the brake control system 10 for changes in the weight of the towed load. The microprocessor 45 stores the selected system gain in its memory. This gain value will be used until the vehicle operator makes a further adjustment or the controller is deenergized.

During initial start-up of the controller 11, the vehicle driver can depress the gain push-button 32 for more than five seconds to cause the microprocessor 45 to zero the brake control signal generator 52.

During normal operation, the towed vehicle brakes are automatically actuated when the towing vehicle brake pedal 21 is depressed by the vehicle driver. Depressing the brake pedal 21 closes the brake light switch 22, applying $V_b$ to the automatic mode trigger 70. In response, the automatic mode trigger 70 causes the trigger signal input pin 73 to go high, thereby enabling the automatic mode of operation of the microprocessor 45. As the towing vehicle hydraulic brake system 20 is actuated, the resulting deceleration of the towing vehicle causes the pendulum in the pendulum device 135 to be displaced from its rest position, generating an output voltage which is proportional to the amount of displacement. The output voltage is supplied to the non-inverting input of the operational amplifier 142. The difference between the pendulum device output voltage and the null voltage is amplified in the operational amplifier 142 to produce an analog automatic brake control signal. The brake control signal is applied to the first channel of the A/D converter 49 which converts the analog signal into a digital automatic brake control signal. The digital brake control signal is applied to the automatic mode input pin 46 of the microprocessor 45.

The microprocessor 45 checks to determine that it is receiving both an trigger signal and an brake control signal on the automatic mode input pin 46. If the check confirms that both inputs are present, the microprocessor 45 generates an output signal comprising a constant frequency square wave pulse train having a duty cycle proportional to the brake control signal.

The output signal is applied to the brake driver 59 which amplifies and inverts the pulse train. The inverted pulse train switches the P-channel MOSFET's 192, 196 and 197 in the brake switching circuit 62 between their conducting and non-conducting states. When the MOSFET's are conducting, electric current flows to the electromagnets 19 in the towed vehicle brakes 13 and 14. The amount of power supplied to the towed vehicle brakes 13 and 14 is proportional to the duty cycle of the output signal.

Simultaneous with generating the output signal, the microprocessor 45 illuminates selected LED's 33 in the light display 90 to provide the vehicle driver with an indication of the magnitude of braking effort.

Alternately, the vehicle driver can press either the manual switch 30 or manual remote switch 31 to generate an analog manual brake control signal. The manual brake signal, which is proportional to the displacement of either of the manual switches, 30 or 31, is applied to the second channel of the A/D converter 49. The A/D converter converts the analog signal to a digital manual brake control signal which is applied to the manual brake control signal input pin 47 of the microprocessor 45.

Whenever a signal is applied to the manual brake control signal input pin 47, the microprocessor 45 generates an output signal which actuates the towed vehicle brakes 13 and 14 as described above. The output pulse train will be generated in response to a manual brake control signal even if there is no trigger signal present at the trigger signal input pin 73. If the controller 11 is operating in the automatic mode when one of the manual switches 31 and 32 is depressed, the manual brake control signal has priority and overrides the automatic brake control signal present on the corresponding input pin 46.

The manual brake control signal also causes the microprocessor 45 to illuminate selected LED's 33 in the light display 90 to provide the vehicle driver with an indication of the magnitude of braking effort. Additionally, the microprocessor stop light actuation pin 65 goes high, causing the brake light driver first and second stage transistors 221 and 224 to switch to their on states. This energizes the coil 230 in the brake light relay 66, closing the relay contacts 232 to illuminate the towing vehicle and towed vehicle brake lights 24 and 25.

Figure 4:
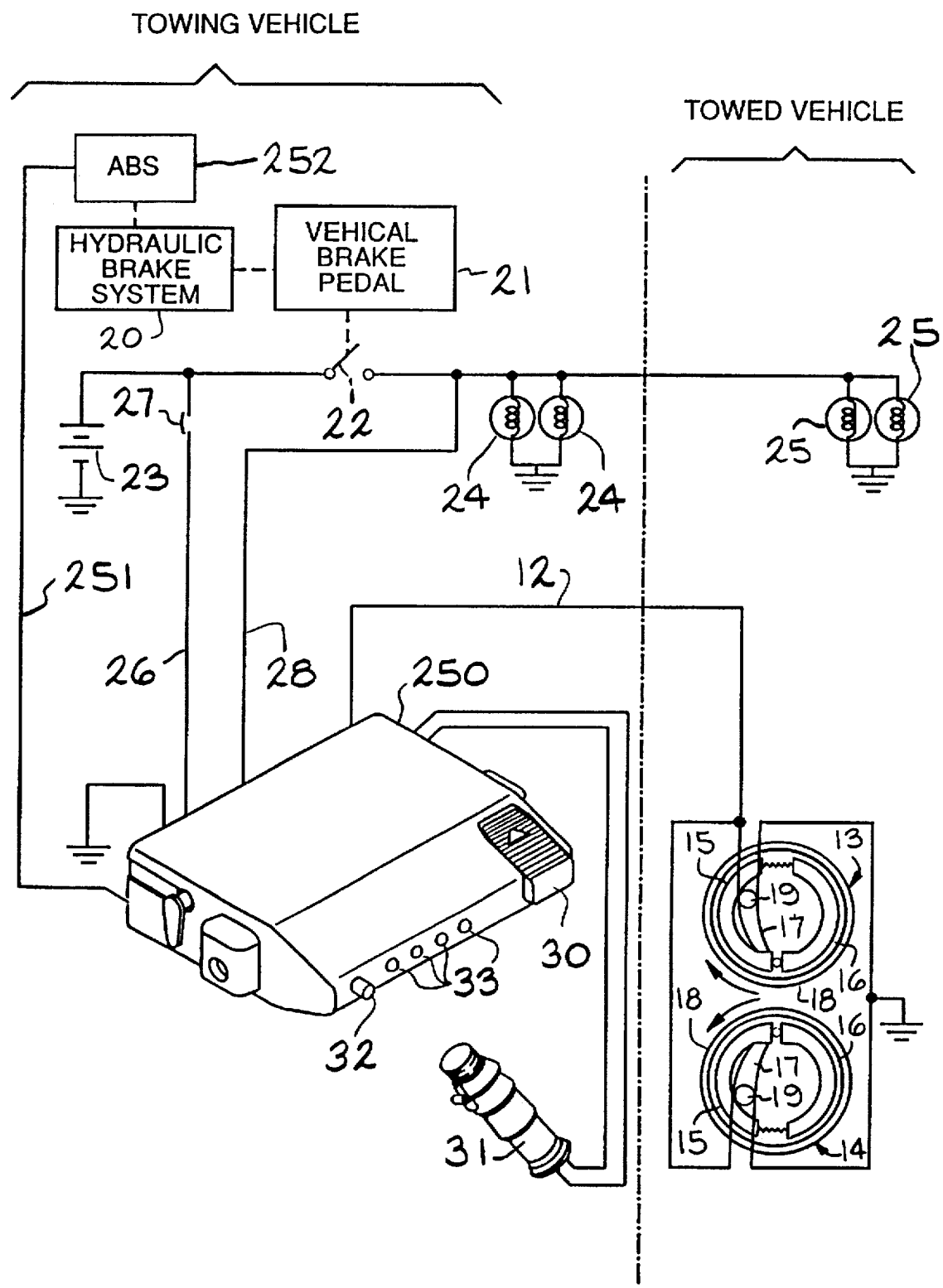
FIG. 4 is a schematic diagram of an alternate embodiment of the electronic brake controller shown in FIG. 1.

An alternate embodiment of the electronic brake controller is illustrated in the schematic diagram shown in FIG. 4. In FIG. 4, the brake controller is identified with the number 250. The components in FIG. 4 which are the same as components shown in FIG. 1 have the same numerical designator.

The controller 250 is electrically coupled by a data link 251 to an anti-lock brake system 252 (ABS), which is included in the towing vehicle. While a single line is shown for the data link 251 in FIG. 4, it will be appreciated that the data link 251 may be a multi-conductor cable or a portion of a data highway.

The ABS 252 is of a conventional design. The ABS 252 is responsive to data concerning the operation of the towing vehicle to control the hydraulic brake system 20 during impending wheel brake lock-up conditions. The ABS 252 sends data over the data link 251 to the controller 250. The controller 250 is responsive to the data to control the towed vehicle brakes 13 and 14 as a function thereof. For example, actuation of the ABS 252 due to an impending wheel lock-up condition of the towing vehicle brakes could cause the brake controller 250 to decrease the braking of the towed vehicle. Other data which can be transmitted from the ABS 252 to the controller 250 can include vehicle speed, vehicle deceleration, brake failure, brake application, and changes in road surface conditions.

In the preferred embodiment, the communication over the data link 251 is bidirectional, with the controller 250 also sending data to the ABS 252. For example, the controller 250 could send a controller gain setting, which is indicative of the towed vehicle load, to the ABS 252. The ABS 252 could then adjust the magnitude of the towing vehicle braking accordingly. However, it will be appreciated that the communication over the data link 251 also can be in only one direction.

While the controller 250 has been illustrated as being connected to an ABS 252, it will be appreciated that the controller 250 could be similarly connected to and communicating with other vehicle control systems. Examples of such systems include traction control systems, engine control computers and vehicle diagnostic computers.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the invention has been described above in the preferred embodiment as including a preprogrammed microprocessor for manipulating input signals to generate desired output waveforms. However, it will be appreciated that other means for producing the brake driver signal can be used in place of the microprocessor 45. For example, it is possible to practice the invention with the microprocessor logic circuitry and memory replaced by diode arrays that produce similar output waveforms when excited by the input signals.

What is claimed is:

1. An electronic brake controller for actuating electric wheel brakes of a towed vehicle, the towed vehicle being associated with a towing vehicle having a set of wheel brakes, the electronic brake controller comprising:

a sensor for producing a brake control signal which is representative of the desired braking of the towed vehicle said brake control signal including a sensor bias component; and a control device responsive to said brake control signal for generating an output signal for actuating the electric wheel brakes of the towed vehicle, said control device responsive to the actuation of a zero adjust switch for measuring the voltage level of said brake control signal and for generating a zero adjust signal in response thereto, said control device further responsive to actuation of said zero adjust switch to subtract said zero adjust signal from said brake control signal whereby zero adjust signal cancels said bias component of said brake control signal.

2. An electronic brake controller for actuating electric wheel brakes of a towed vehicle, the towed vehicle being associated with a towing vehicle having a set of wheel brakes, the electronic brake controller comprising:

a control device having first and second input terminals and an output terminal, said control device responsive to a brake control signal applied to said first input terminal to generate an output signal at said output terminal for actuating the electric wheel brakes of the towed vehicle;

a sensor having an output terminal electrically coupled to said first input terminal of said control device, said sensor having a rest position, said sensor generating a rest position bias component while in said rest position and being responsive to deceleration of the towing vehicle to generate a brake control signal at said sensor output terminal, said brake control signal including said rest position bias component; and a null signal generator having an output terminal electrically coupled to said second input terminal of said control device, said null signal generator continuously generating a null signal, said control device combining said null signal and said brake control signal whereby said null signal cancels said rest position bias component of said brake control signal.

3. An electronic brake controller according to claim 2 wherein said null signal corresponds to said rest position bias component of said brake control signal.

4. An electronic brake controller according to claim 3 wherein said control device includes a comparitor which is operative to subtract said null signal from said brake control signal to cancel said rest position bias component of said brake control signal.

5. An electronic brake controller according to claim 4 wherein said control device includes a microprocessor, said microprocessor sensing said rest position bias component and cooperating with said null signal generator to generate said null voltage.

6. An electronic brake controller for actuating electric wheel brakes of a towed vehicle, the towed vehicle being associated with a towing vehicle having a set of wheel brakes, the electronic brake controller comprising:

a control device having first and second input terminals and an output terminal, said control device responsive to a brake control signal applied to said first input terminal to generate an output signal at said output terminal for actuating the electric wheel brakes of the towed vehicle, said control device including a comparitor and a microprocessor having a plurality of output pins;

a sensor having an output terminal electrically coupled to said first input terminal of said control device, said sensor responsive to deceleration of the towing vehicle to generate a brake control signal at said sensor output terminal, said brake control signal including a bias component; and a null signal generator having an output terminal electrically coupled to said second input terminal of said control device, said null signal generator including a resistance array, said resistance array being electrically coupled to said plurality of output pins of said microprocessor, said microprocessor sensing said bias component and being responsive thereto to cause said resistor array to continuously generate a null signal, said null signal corresponding to said bias component and said comparitor in said control device being operative to combine said null signal and said brake control signal whereby said null signal cancels said bias component.

7. An electronic brake controller according to claim 6 wherein said microprocessor includes a plurality of output pins connected to said resistor array and a memory portion, said memory portion storing a table correlating bias component magnitudes to said microprocessor output pins, said microprocessor responsive to said bias component magnitude to select a particular one of said output pins from said memory corresponding to said bias component magnitude, said microprocessor operative to energize a selected output pin to cause said resistance array to generate said null signal corresponding to said bias component magnitude.

8. An electronic brake controller according to claim 7 further including a visual display connected to said control device, said control device responsive to generation of said null signal to actuate said visual display to indicate that said bias component is canceled.

9. An electronic brake controller according to claim 8 wherein said visual display includes a plurality of light emitting diodes.

10. An electronic brake controller according to claim 6 further including a vehicle operator actuated device coupled to said microprocessor, said operator actuated device operable by the vehicle operator to cause said microprocessor to sense said bias component and generate a corresponding null signal.

11. An electronic brake controller according to claim 10 wherein said operator actuated device is a push-button.

12. An electronic brake controller according to claim 10 wherein said sensor includes a pendulum having a rest position, said pendulum generating said bias component when in said rest position and further generating said brake control signal when displaced from said rest position with said brake control signal including said bias component.

13. An electronic brake controller according to claim 6 wherein said microprocessor is responsive to the brake controller being energized to sense said bias component and generate a corresponding null signal.

14. An electronic brake controller according to claim 13 wherein said sensor includes a pendulum having a rest position, said pendulum generating said bias component when in said rest position and further generating said brake control signal when displaced from said rest position with said brake control signal including said bias component.

15. An electronic brake controller for actuating electric wheel brakes of a towed vehicle, the towed vehicle being associated with a towing vehicle having a set of wheel brakes, the electronic brake controller comprising:

a sensor having an output terminal, said sensor having a rest position, said sensor generating a rest position bias component while in said rest position and being responsive to deceleration of the towing vehicle to generate a brake control signal at said sensor output terminal, said brake control signal including said rest position bias component; and a control device having an input terminal and an output terminal, said control device input terminal electrically coupled to said sensor output terminal, said control device being responsive to said brake control signal being applied to said input terminal to remove said rest position bias component from said brake control signal to generate a modified brake control signal, said control device being responsive to said modified brake control signal to generate an output signal at said control device output terminal for actuating the electric wheel brakes of the towed vehicle.

16. An electronic brake controller according to claim 15 wherein said control device includes a null signal generator, said null signal generator continuously generating a null signal, said control device combining said null signal and said brake control signal such that said null signal cancels said bias component of said brake control signal.

* * * * *